United States Patent
Oh et al.

(10) Patent No.: US 10,433,242 B2
(45) Date of Patent: Oct. 1, 2019

(54) DEVICE AND METHOD WHEREBY ELECTRONIC DEVICE SELECTS WIRELESS NETWORK

(71) Applicant: Samsung Electronics Co., Ltd., Gyeonggi-do (KR)

(72) Inventors: Hun-Cheol Oh, Seoul (KR); Kwang-Min Kil, Gyeonggi-do (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 14 days.

(21) Appl. No.: 15/507,130

(22) PCT Filed: Aug. 27, 2014

(86) PCT No.: PCT/KR2014/007983
§ 371 (c)(1),
(2) Date: Feb. 27, 2017

(87) PCT Pub. No.: WO2016/032020
PCT Pub. Date: Mar. 3, 2016

(65) Prior Publication Data
US 2017/0289903 A1    Oct. 5, 2017

(51) Int. Cl.
*H04W 48/18* (2009.01)
*H04L 12/26* (2006.01)
*H04W 72/08* (2009.01)

(52) U.S. Cl.
CPC ............. *H04W 48/18* (2013.01); *H04L 43/10* (2013.01); *H04W 72/085* (2013.01)

(58) Field of Classification Search
CPC ......... H04L 47/10; H04L 47/30; H04L 47/11; H04L 47/12; H04L 2012/5631;
(Continued)

(56) References Cited

U.S. PATENT DOCUMENTS 8,874,160 B2 * 10/2014 Hegge .................. H04W 52/46
370/235
2007/0133480 A1    6/2007 Nam et al.
(Continued)

FOREIGN PATENT DOCUMENTS

EP       1954077 A1     8/2008
KR    10-2007-0054080 A   5/2007
(Continued)

OTHER PUBLICATIONS

Cha Jae Bok, Link Adaption, Jun. 21, 2015, http://m.ktword.co.kr/abbr_view.php?m_temp1=2871&id=775, 4 pages.
(Continued)

*Primary Examiner* — Brenda H Pham
(74) *Attorney, Agent, or Firm* — Cha & Reiter, LLC

(57) ABSTRACT

An embodiment of the present invention relates to an apparatus and a method for selecting a network in an electronic device supporting multiple communications methods by considering channel environment related indicators. The method for determining a network can comprise the following steps of: checking data transmission control information on networks; and determining at least one network to be accessed among the networks based on the data transmission control information on the networks.

16 Claims, 7 Drawing Sheets

(58) Field of Classification Search
CPC ..... H04L 47/15; H04L 47/2441; H04L 47/70; H04L 47/35; H04L 47/32
USPC ............. 370/229, 230, 235, 310.2, 328, 338
See application file for complete search history.

(56) References Cited

U.S. PATENT DOCUMENTS

| | | | |
|---|---|---|---|
| 2007/0217377 A1* | 9/2007 | Takeuchi | H04W 48/20 370/338 |
| 2009/0104907 A1 | 4/2009 | Otting et al. | |
| 2010/0234042 A1* | 9/2010 | Chan | H04W 36/0061 455/453 |
| 2010/0265913 A1 | 10/2010 | Gorokhov et al. | |
| 2011/0026623 A1 | 2/2011 | Srinivasa et al. | |
| 2012/0088539 A1* | 4/2012 | Jeong | H04B 17/0057 455/525 |
| 2013/0258870 A1* | 10/2013 | MacIas | H04W 48/18 370/252 |
| 2013/0260757 A1* | 10/2013 | Deivasigamani | H04W 24/00 455/435.3 |
| 2013/0329666 A1* | 12/2013 | Degani | H04W 72/08 370/329 |
| 2015/0222507 A1* | 8/2015 | Choy | H04L 43/0811 370/252 |
| 2015/0312824 A1* | 10/2015 | Thalanany | H04W 36/165 455/435.1 |

FOREIGN PATENT DOCUMENTS

| | | |
|---|---|---|
| KR | 20080072572 A | 8/2008 |
| KR | 10-2010-0072045 A | 6/2010 |
| KR | 20110071325 A | 6/2011 |
| KR | 20110071793 A | 6/2011 |
| KR | 20120022976 A | 3/2012 |
| KR | 20120037088 A | 4/2012 |
| KR | 20120060821 A | 6/2012 |
| KR | 20120093753 A | 8/2012 |
| KR | 20120093760 A | 8/2012 |

OTHER PUBLICATIONS

Korean Search Report dated May 9, 2019.

\* cited by examiner

DEVICE AND METHOD WHEREBY ELECTRONIC DEVICE SELECTS WIRELESS NETWORK

CLAIM OF PRIORITY

This application is a National Phase Entry of PCT International Application No. PCT/KR2014/007983, which was filed on Aug. 27, 2014, the contents of which are incorporated herein by reference.

BACKGROUND ART

Embodiments of the present disclosure relate to an electronic device and, more particularly, to an apparatus and a method for selecting a wireless network in an electronic device.

With the development of communication technologies and semiconductor technologies, portable electronic devices can support a plurality of communication schemes. For example, the portable electronic device may access one or more communication networks of a Global System for Mobile Communication (GSM) network, an Enhanced Data GSM Environment (EDGE) network, a Code Division Multiple Access (CDMA) network, a Wideband Division Multiple Access (W-CDMA) network, a High Speed Packet Access (HSPA) network, an Evolved HSPA (HSPA+) network, a Long Term Evolution (LTE) network, and a Wireless Local Area Network (WLAN).

When the portable electronic device supports a plurality of communication schemes, the portable electronic device may select a serving network by using a fixed priority. For example, the portable electronic device may select the serving network to access based on a max data rate supportable by communication networks. That is, when selecting the serving network, the portable electronic device does not consider an actual wireless environment of an area in which the portable electronic device is located. Here, the wireless environment may include one or more of a Signal to Interference and Noise Ratio (SINR) and network load.

DETAILED DESCRIPTION OF THE INVENTION

Technical Problem

As described above, since the portable electronic device selects the serving network without regard to an actual wireless environment, the problem in which a maximum data transmission rate cannot be guaranteed in the actual wireless environment may occur.

An embodiment of the present disclosure may provide an apparatus and a method for selecting a serving network in consideration of channel environment-related indexes by an electronic device which supports a plurality of communication schemes.

An embodiment of the present disclosure may provide an apparatus and a method for selecting a serving network in consideration of data transmission rates by an electronic device which supports a plurality of communication schemes.

An embodiment of the present disclosure may provide an apparatus and a method for selecting a serving network in consideration of data transmission control information of each network by an electronic device which supports a plurality of communication schemes.

In accordance with an aspect of the present disclosure, a method of operating an electronic device is provided. The method includes: identifying data transmission control information of networks; and determining one or more networks to be accessed among the networks based on the data transmission control information of the networks.

In accordance with another aspect of the present disclosure, an electronic device is provided. The electronic device includes: a plurality of communication systems; and a processor configured to identify data transmission control information of networks through the communication systems and determines one or more networks to be accessed among the networks based on the data transmission control information of the networks.

BEST MODE FOR CARRYING OUT THE INVENTION

Hereinafter, an embodiment of the present disclosure will be described in detail with reference to the accompanying drawings. Further, in the following description of the present disclosure, a detailed description of known functions and configurations incorporated herein will be omitted when it may make the subject matter of the present disclosure rather unclear. The terms which will be described below are terms defined in consideration of the functions in embodiments of the present disclosure, and may vary depending on users, intentions of operators, or customs. Therefore, the definitions of the terms should be made based on the contents throughout the specification.

Hereinafter, embodiments of the present disclosure describe a technology for selecting a serving network in consideration of a channel environment-related index.

In the following description, the channel environment-related index may include data transmission control information of each network or the data transmission control information and channel environment information. Here, the channel environment information may indicate channel information such as a Received Signal Strength Indicator (RSSI), Reference Signal Received Power (RSRP), Reference Signal Received Quality (RSRQ), a signal to noise ratio (Ec/Io), and a Channel Quality Indicator (CQI) which the electronic device can measure for communication with the network. The data transmission control information may indicate parameter information, which is associated with a data transmission rate determined by a Base Station (BS) according to the channel environment information, such as a Modulation and Coding Selection (MCS) level, a Resource Block (RB), Carrier Aggregation (CA), a band width, and network load.

In the following description, the electronic device may be a combination of one or more of various devices such as a portable electronic device, a portable terminal, a mobile terminal, a mobile pad, a media player, a Personal Digital Assistant (PDA), a desktop computer, a laptop computer, a smart phone, a netbook, a television, a Mobile Internet Device (MID), an Ultra Mobile PC (UMPC), a Tablet Personal Computer (PC), a navigation unit, a smart TV, a wrist watch, a digital camera, and an MP3, which support a plurality of communication schemes.

In the following description, the BS may include a wireless station such as a mobile communication BS, an Access Point (AP), and a femto BS, which support a communication service of the electronic device by using radio resources.

Figure 1:
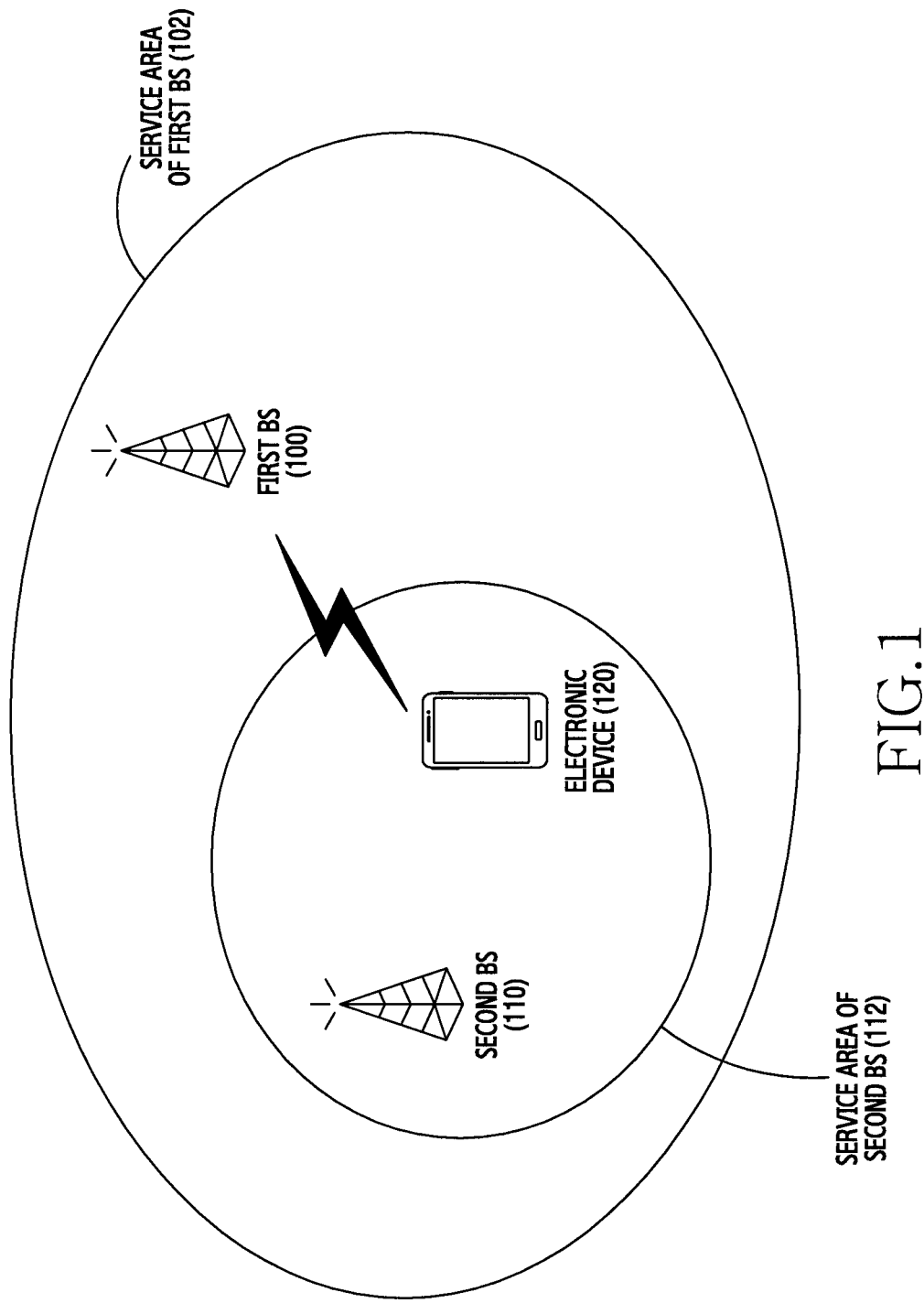
FIG. 1 illustrates a configuration of a wireless communication system according to an embodiment of the present disclosure.

FIG. 1 illustrates a configuration of a wireless communication system according to an embodiment of the present disclosure.

Referring to FIG. 1, the wireless communication system may include a first BS 100 of a first communication scheme and a second BS 110 of a second communication scheme. The first BS 100 and the second BS 110 may support a link adaptation scheme which can adaptively change a data transmission rate. For example, the first BS 100 and the second BS 110 may support an Adaptive Modulation and Coding (AMC) scheme which can adaptively change the data transmission rate in accordance with a channel environment by changing a modulation and coding format according to the channel environment. For example, the first BS 110 and the second BS 110 may select an MCS level suitable for the channel environment among preset Modulation and Coding Selection (MCS) levels and provide a data service.

When the electronic device 120 is located in an area where a service area 102 of the first BS 100 and a service area 112 of the second BS 110 overlap each other, the electronic device 120 may compare channel environment-related indexes of the first BS 100 and the second BS 110 and select a serving network. For example, when it is assumed that the first BS 100 supports an LTE network and allocates MCS level 15 to the electronic device 120, the electronic device 120 may support a data transmission rate of about 31 Mbps (31704 Mbps) based on Table 1 below.

TABLE 1

| MCS Index | Modulation Order | TBS Index | Redundancy Version | T-PUT (Kbps) |
|---|---|---|---|---|
| 0 | 2 | 0 | 0 | 3112 |
| 1 | 2 | 1 | 0 | 4008 |
| 2 | 2 | 2 | 0 | 4968 |
| 3 | 2 | 3 | 0 | 6456 |
| 4 | 2 | 4 | 0 | 7992 |
| 5 | 2 | 5 | 0 | 9528 |
| 6 | 2 | 6 | 0 | 11448 |
| 7 | 2 | 7 | 0 | 13536 |
| 8 | 2 | 8 | 0 | 15264 |
| 9 | 2 | 9 | 0 | 17568 |
| 10 | 2 | 10 | 0 | 19080 |
| 11 | 4 | 10 | 0 | 19080 |
| 12 | 4 | 11 | 0 | 22152 |
| 13 | 4 | 12 | 0 | 25456 |
| 14 | 4 | 13 | 0 | 28336 |

TABLE 1-continued

| MCS Index | Modulation Order | TBS Index | Redundancy Version | T-PUT (Kbps) |
|---|---|---|---|---|
| 15 | 4 | 14 | 0 | 31704 |
| 16 | 4 | 15 | 0 | 34008 |
| . | . | . | . | . |
| . | . | . | . | . |
| . | . | . | . | . |

When it is assumed that the second BS 110 supports a WLAN network and allocates MCS level 10 to the electronic device 120, the electronic device 120 may support a data transmission rate of 39 Mbps based on Table 2 below.

TABLE 2

| | | | | Data RAte Mb/s | | | |
|---|---|---|---|---|---|---|---|
| | | | | 20 MHz channel | | 40 MHz channel | |
| MCS Index | Spatial Streams | Modulation Type | Coding Rate | 800 ns GI | 400 ns GI | 800 ns GI | 400 ns GI |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16 QAM | 1/2 | 26.00 | 28.90 | 54.00 | 60.00 |
| 4 | 1 | 16 QAM | 3/4 | 39.00 | 43.30 | 81.00 | 90.00 |
| 5 | 1 | 64 QAM | 2/3 | 52.00 | 57.80 | 108.00 | 120.00 |
| 6 | 1 | 64 QAM | 3/4 | 58.50 | 65.00 | 121.50 | 135.00 |
| 7 | 1 | 64 QAM | 5/6 | 65.00 | 72.20 | 135.00 | 150.00 |
| 8 | 2 | BPSK | 1/2 | 13.00 | 14.40 | 27.00 | 30.00 |
| 9 | 2 | QPSK | 1/2 | 26.00 | 28.90 | 54.00 | 60.00 |
| 10 | 2 | QPSK | 3/4 | 39.00 | 43.30 | 81.00 | 90.00 |
| . | . | . | . | . | . | . | . |
| . | . | . | . | . | . | . | . |
| . | . | . | . | . | . | . | . |

The electronic device 120 may select the second BS 110 as the serving network in consideration of the MCS levels with the first BS 100 and the second BS 110. The electronic device 120 may perform network switching to the second BS 110.

In another example, when it is assumed that the first BS 100 supports the LTE network and allocates MCS level 15 to the electronic device 120, the electronic device 120 may support a data transmission rate of about 31 Mbps (31704 Mbps) based on Table 1. When it is assumed that the second BS 110 supports the WLAN network and allocates MCS level 9 to the electronic device 120, the electronic device 120 may support a data transmission rate of 36 Mbps based on Table 2. The electronic device 120 may select the first BS 100 as the serving network in consideration of the MCS levels with the first BS 100 and the second BS 100.

In the above described embodiment, the electronic device 120 may select one of the BSs 100 and 110 which support different networks as the serving BS in consideration of the channel environment-related index.

In another embodiment, when one BS supports a plurality of communication networks, the electronic device 120 may select the serving network in consideration of channel environment-related indexes of the networks, which the electronic device 120 can access through one BS.

Figure 2:
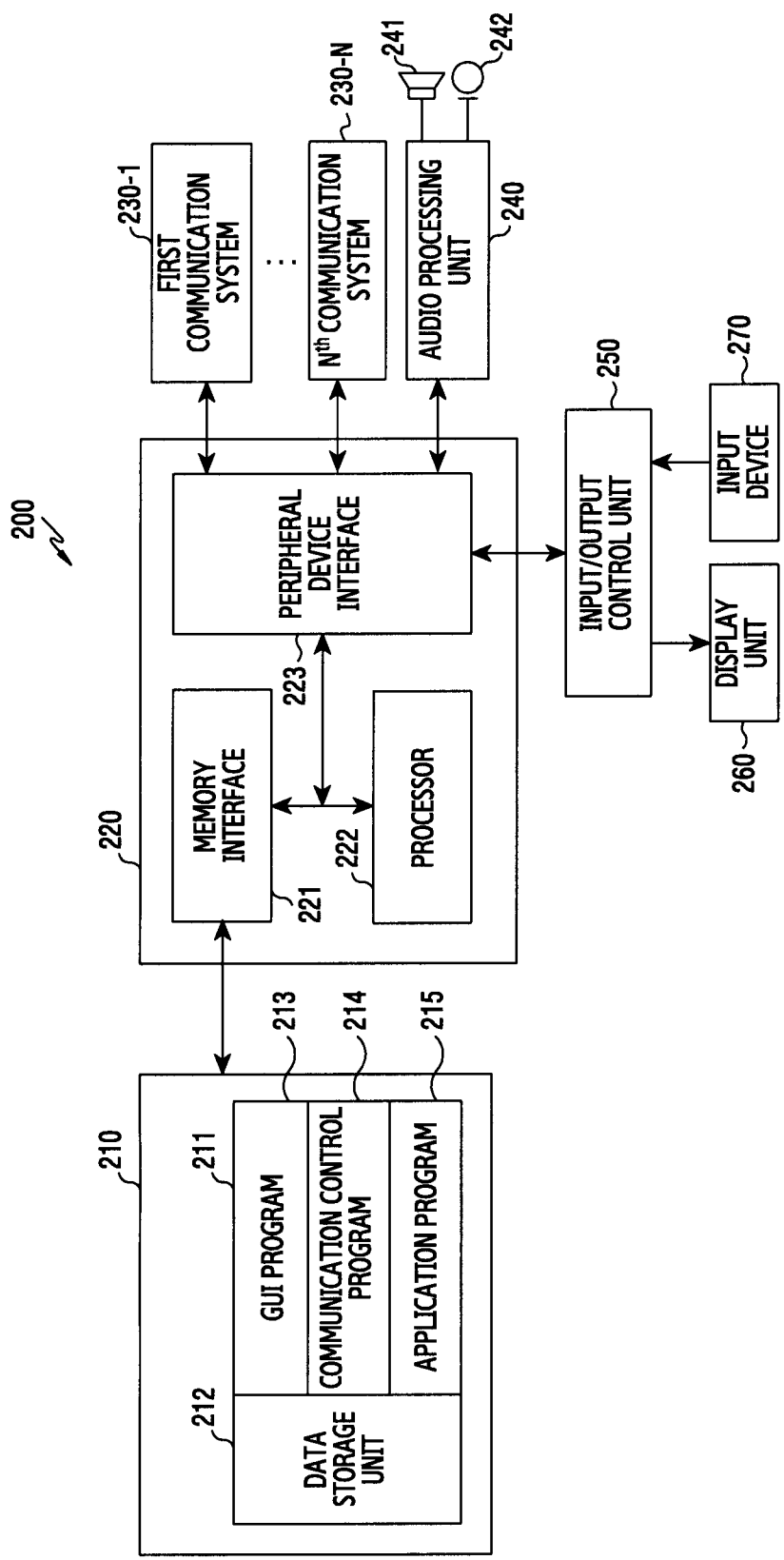
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 200 may include a memory 210, a processor unit 220, communication systems 230-1 to 230-N, an audio processing unit 240, an input/output control unit 250, a display unit 260, an input device 270. The number of memories 210 may be plural.

The memory 210 may include a program storage unit 211 that stores one or more programs to control an operation of the electronic device 200 and a data storage unit 212 that stores data generated by driving of the electronic device 200.

The data storage unit 212 may store an MCS level table for each network which the electronic device 200 can access, as illustrated in Table 1 and Table 2.

The program storage unit 211 may include a Graphic User Interface (GUI) program 213, a communication control program 214, and at least one application program. Programs included in the program storage unit may be expressed as an instruction set which is a set of instructions.

The GUI program 213 may include at least one software component for graphically providing a user interface to the display unit 260. The GUI program 213 may control the display unit 260 to display application program information driven by the processor 222.

The communication control program 214 may include at least one software component for comparing channel environment-related indexes of networks which the electronic device 200 can access and selecting the serving network. For example, the communication control program 214 may transmit channel environment information to the accessible network, receive data transmission control information from the corresponding network, and select the serving network by using the received data transmission control information. Referring to FIG. 1, the communication control program 214 may select the serving network by comparing the MCS levels of the first BS 100 and the second BS 110. In another example, the communication control program 214 may select the serving network by comparing data transmission control information and channel environment information of the accessible networks. Referring to FIG. 1, the communication control program 214 may select the serving network by comparing the MCS levels and CQI of the first BS 100 and the second BS 110.

The application program 215 may include a software component for at least one application program installed in the electronic device 200.

The processor unit 220 may include a memory interface 221, at least one processor 222, and a peripheral device interface 223. One or more of the memory interface 221, at least one processor 222, and the peripheral device interface 223 included in the processor unit 220 may be integrated into at least one integrated circuit or may be implemented as separate elements.

The memory interface 221 may control access of elements such as the processor 222 or the peripheral device interface 223 to the memory 210.

The peripheral device interface 223 may control a connection between an input/output peripheral device of the electronic device 200 and the processor 222 and a connection between the input/output peripheral device of the electronic device 200 and the memory interface 221.

The processor 222 may control the electronic device 200 to provide various multimedia services by using at least one program.

The processor 222 may make a control to execute at least one program stored in the memory 210 and to provide a service corresponding to the corresponding program. The processor 222 may execute the communication control program 214 stored in the program storage unit 211 and compare channel environment-related indexes of the networks, which the electronic device 200 can access, to select the serving network. For example, the processor 222 may transmit channel environment information to the accessible network, receive data transmission control information from the corresponding network, and select the serving network by using the received data transmission control information. Referring to FIG. 1, the processor 220 may select the serving network by comparing the MCS levels of the first BS 100 and the second BS 110. In another example, the processor 220 may select the serving network by comparing data transmission control information and channel environment information of the accessible networks. Referring to FIG. 1, the processor 220 may select the serving network by comparing the MCS levels and CQI of the first BS 100 and the second BS 110.

The communication systems 230-1 to 230-N may perform at least one communication function of voice communication and data communication. The communication systems 230-1 to 230-N may perform communication functions according to different communication schemes among one or more communication networks of a Global System for Mobile Communication (GSM) network, an Enhanced Data GSM Environment (EDGE) network, a Code Division Multiple Access (CDMA) network, a Wideband Division Multiple Access (W-CDMA) network, a High Speed Packet Access (HSPA) network, an Evolved HSPA (HSPA+) network, a Long Term Evolution (LTE) network, and a Wireless Local Area Network (WLAN).

The audio processing unit 240 may provide an audio interface between the user and the electronic device 100 through a speaker 241 and a microphone 242.

The input/output control unit 250 may provide an interface between an input/output device such as the display unit 260 and the input device 270, and the processor 222.

The display unit 260 may display status information of the electronic device 200, characters input by the user, a moving picture, and/or a still picture. For example, the display unit 260 may display application program information executed by the processor 222.

The input device 270 may provide input data generated by user's selection to the processor 222 through the input/output control unit 250. For example, the input device 270 may include one or more of a keypad including at least one hardware button and a touch pad for detecting touch information.

Figure 3:
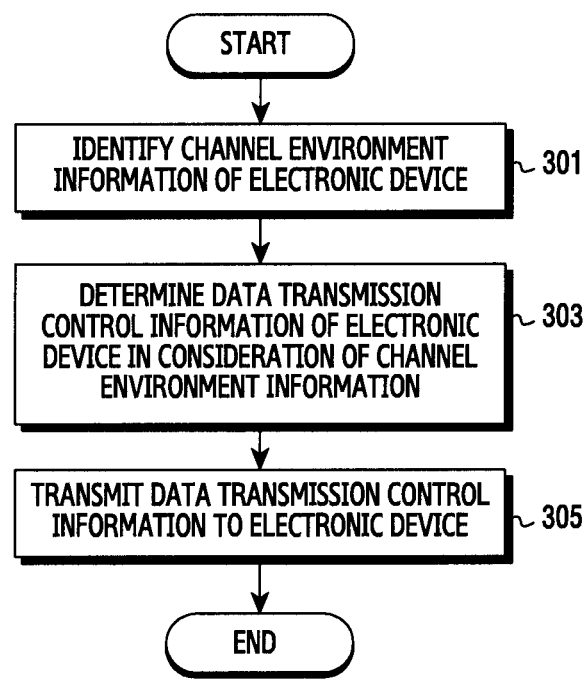
FIG. 3 illustrates a process in which a BS determines data transmission control information according to an embodiment of the present disclosure.

When the electronic device 200 receives data transmission control information from the BS, the BS may perform an operation illustrated in FIG. 3 to determine the data transmission control information.

FIG. 3 illustrates a process in which the BS determines data transmission control information according to an embodiment of the present disclosure.

Referring to FIG. 3, the BS may identify channel environment information of the electronic device located in a service area in step 301. For example, the BS may receive the channel environment information from the electronic device located in the service area.

The BS may determine data transmission control information of the electronic device in consideration of one or more of the channel environment information of the electronic device and wireless environment information in step 303. For example, the BS may determine an MCS level of the electronic device in consideration of one or more of CQI of the electronic device and the wireless environment information. Here, the wireless environment information may include one or more of a Signal to Interference and Noise Ratio (SINR) and network load.

After determining the data transmission control information of the electronic device, the BS may transmit the data transmission control information to the electronic device in step 305.

Figure 4:
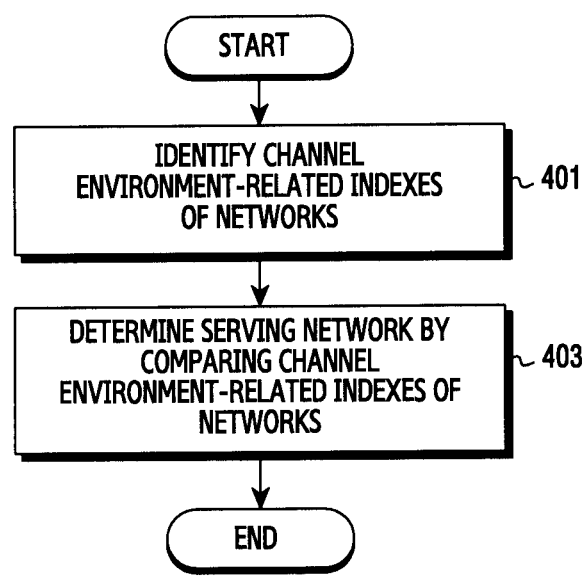
FIG. 4 illustrates a process in which an electronic device determines a serving network according to an embodiment of the present disclosure.

FIG. 4 illustrates a process in which the electronic device determines a serving network according to an embodiment of the present disclosure.

Referring to FIG. 4, the electronic device may identify channel environment-related indexes for a plurality of accessible networks in step 401. For example, the electronic device may identify data transmission control information of networks received from the plurality of accessible networks. In another example, the electronic device may identify the channel environment information of each network by using reference signals received from the plurality of accessible networks. In another example, the electronic device may identify the channel environment information of each network by performing a ping test on the plurality of accessible networks.

The electronic device determines a serving network by comparing the channel environment-related indexes of the networks in step 403. For example, when determining the serving network in consideration of MCS levels of the networks, the electronic device may identify a data transmission rate according to the MCS level of each network in an MCS level table for each network stored in the data storage unit 212. The electronic device may determine a network having the relatively highest data transmission rate among the accessible networks as the serving network. In another example, the electronic device may determine the serving network by comparing the MCS levels and CQI of the accessible networks.

Figure 5:
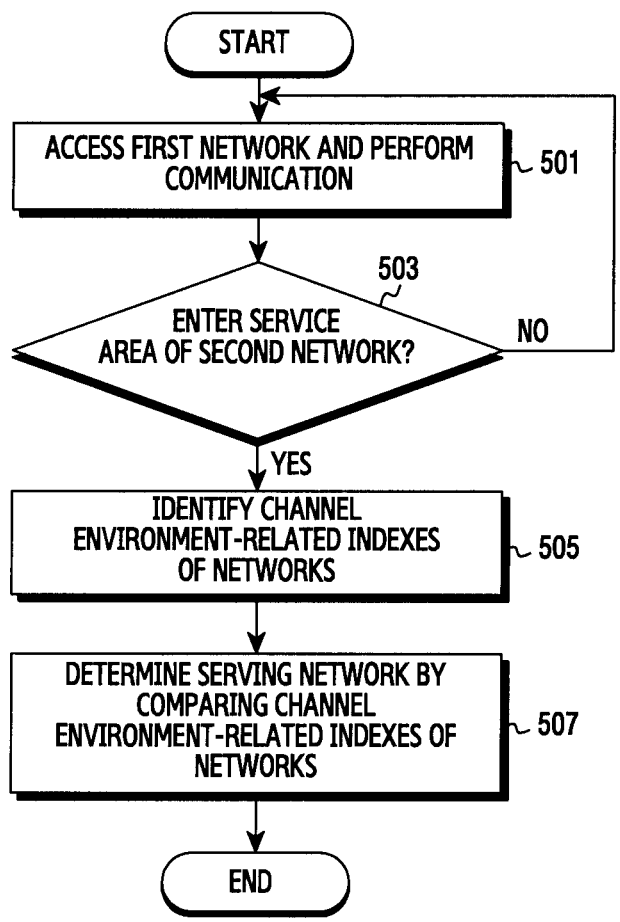
FIG. 5 illustrates a process in which an electronic device determines a serving network according to an embodiment of the present disclosure.

FIG. 5 illustrates a process in which the electronic device determines a serving network according to an embodiment of the present disclosure.

Referring to FIG. 5, the electronic device which can access a plurality of networks may access a first network and perform a communication service in step 501. For example, the electronic device 120 may access the first BS 100, which supports the first communication scheme, and perform the data communication in FIG. 1.

The electronic device, which accesses the first network and performs the communication service, may identify whether the electronic device enters a service area of a second network in step 503. The electronic device may identify whether the electronic device enters a service area of a BS, which uses a second communication scheme different from the communication scheme of the first network. For example, referring to FIG. 1, the electronic device 120 may identify whether the electronic device 1020 enters the service area 112 of the second BS 110 according to movement thereof while accessing the first BS 100. The electronic device 120 may identify whether a control signal of the second BS 110 is received while accessing the first BS 100.

When the electronic device does not enter the service area of the second network, the electronic device may access the first network and performs the communication service in step 501.

When the electronic device enters the service area of the second network, the electronic device may identify channel environment-related indexes of the first network and the second network in step 505. For example, the electronic device may receive data transmission control information of each network from the first network and the second network. For example, the electronic device may transmit channel environment information of each network to each of the first network and the second network and receive data transmission control information from each network. In another example, the electronic device may identify channel environment information of each network by using reference signals received from the first network and the second network. In another example, the electronic device may identify the channel environment information of each network by performing a ping test on the first network and the second network.

The electronic device may determine a serving network by comparing the channel environment-related indexes of the networks in step 507. For example, when determining the serving network in consideration of MCS levels of the networks, the electronic device may identify a data transmission rate according to the MCS level of each network in an MCS level table for the networks stored in the data storage unit 212. The electronic device may determine a network having the relatively highest data transmission rate among the accessible networks as the serving network. In another example, the electronic device may determine the serving network by comparing the MCS levels and CQI of the first network and the second network.

In the above described embodiment, when the second network is determined as the serving network, the electronic device may access the second network through networking switching. Meanwhile, when the first network is determined as the serving network, the electronic device may maintain the access to the first network.

Figure 6:
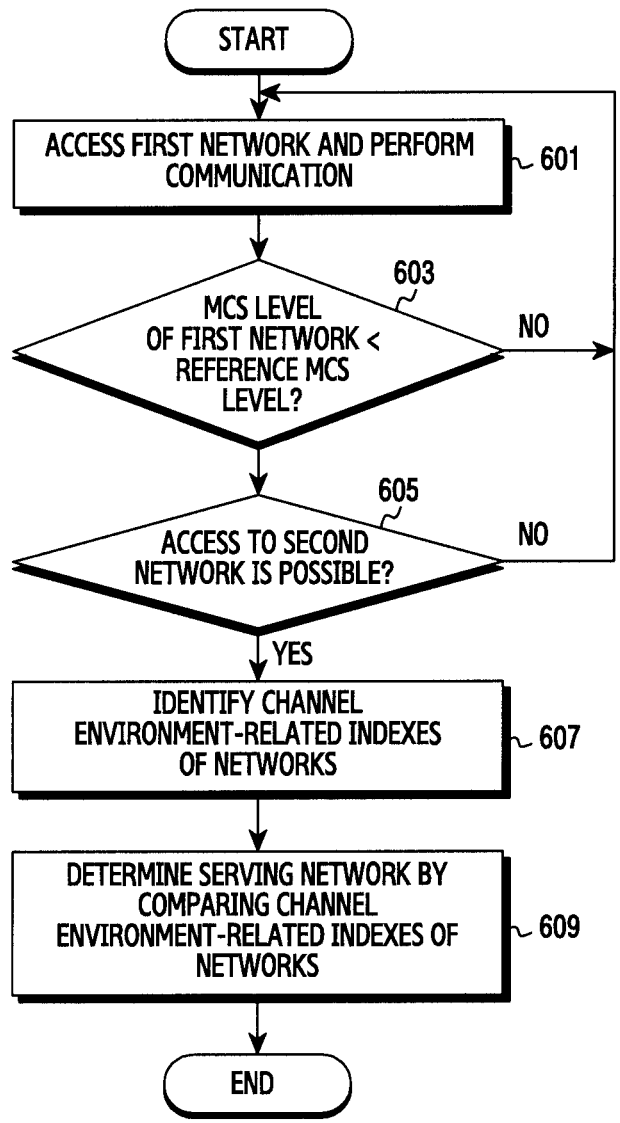
FIG. 6 illustrates a process in which an electronic device determines a serving network according to an embodiment of the present disclosure.

FIG. 6 illustrates a process in which the electronic device determines a serving network according to an embodiment of the present disclosure.

Referring to FIG. 6, the electronic device, which can access a plurality of networks, may access a first network and perform a communication service in step 601. For example, referring to FIG. 1, the electronic device 120 may access the first BS 100, which supports the first communication scheme, and perform the data communication.

The electronic device may identify whether an MCS level for the data communication with the first network is smaller than a reference MCS level in step 603.

When the MCS level for the data communication with the first network is larger than or equal to the reference MCS level, the electronic device may recognize that the data communication can be smoothly performed through the first network and may access the first network and perform the communication service in step 601.

When the MCS level for the data communication with the first network is smaller than the reference MCS level, the electronic device may recognize that the data communication cannot be smoothly performed through the first network and may identify whether access to the second network is possible in step 605. For example, the electronic device may identify whether a control signal is received from a BS, which uses a second communication scheme different from the communication scheme of the first network.

When there is no accessible second network, the electronic device may access the first network and perform the communication service in step 601.

Where there are one or more accessible second networks, the electronic device may identify channel environment-related indexes of the first network and the one or more second networks in step 607. For example, the electronic device may receive data transmission control information of each network from the first network and the second network. For example, the electronic device may transmit channel environment information of each network to each of the first network and the second network and receive data transmission control information from each network. In another example, the electronic device may identify channel environment information of each network by using reference signals received from the first network and the second network. In another example, the electronic device may identify the channel environment information of each network by performing a ping test on the first network and the second network.

The electronic device may determine a serving network by comparing the channel environment-related indexes of the networks in step 609. For example, when determining the serving network in consideration of MCS levels of the networks, the electronic device may identify a data transmission rate according to the MCS level of each network in an MCS level table for the networks stored in the data storage unit 212. The electronic device may determine a network having the relatively highest data transmission rate among the accessible networks as the serving network. In another example, the electronic device may determine the serving network by comparing the MCS levels and CQI of the first network and the second network.

In the above described embodiment, when the MCS level of the first network is smaller than a reference MCS level, the electronic device may recognize that the data communication cannot be smoothly performed through the first network.

In another embodiment, when the MCS level for the data communication with the first network is maintained to be smaller than the reference MCS level for a reference time, the electronic device may recognize that the data communication cannot be smoothly performed through the first network.

Figure 7:
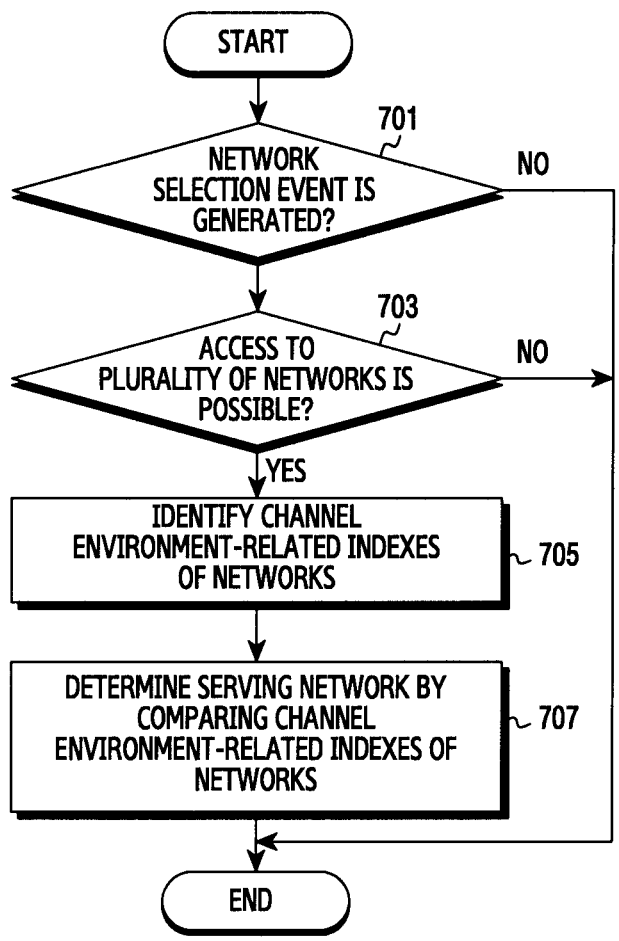
FIG. 7 illustrates a process in which an electronic device determines a serving network according to an embodiment of the present disclosure.

FIG. 7 illustrates a process in which the electronic device determines a serving network according to an embodiment of the present disclosure.

Referring to FIG. 7, the electronic device, which can access a plurality of networks, may identify whether a network selection event is generated in step 701. For example, the electronic device may identify whether power is turned on.

When the network selection event is generated, the electronic device may identify whether there are a plurality of accessible networks in step 703. For example, the electronic device may identify whether control signals of the plurality of networks are received.

When the number of networks, which the electronic device can access, is one, the electronic device may access the corresponding network and perform the data communication.

When the number of networks, which the electronic device can access, is plural, the electronic device identifies channel environment-related indexes of the accessible networks in step 705. The electronic device may identify data transmission control information of networks received from the plurality of accessible networks. For example, the electronic device may transmit channel environment information of each network to the accessible networks and receive data transmission control information from each network. In another example, the electronic device may identify the channel environment information of each network by using reference signals received from the plurality of accessible networks. In another example, the electronic device may identify the channel environment information of each network by performing a ping test on the plurality of accessible networks.

The electronic device may determine a serving network by comparing the channel environment-related indexes of the networks in step 707. For example, when determining the serving network in consideration of MCS levels of the networks, the electronic device may identify a data transmission rate according to the MCS level of each network in an MCS level table for the networks stored in the data storage unit 212. The electronic device may determine a network having the relatively highest data transmission rate among the accessible networks as the serving network. In another example, the electronic device may determine the serving network by comparing the MCS levels and CQI of the first network and the second network.

In the above described embodiment, the electronic device may determine a serving network in consideration of channel environment-related indexes of the accessible networks.

In another embodiment, the electronic device may determine a serving BS in consideration of channel environment-related indexes of BSs, which support the same network.

Methods according to embodiments stated in the claims and/or specifications may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to perform methods according to embodiments stated in the claims and/or specifications of the present invention.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs may be stored in a memory configured by a combination of some or all of the listed components. Further, a plurality of configuration memories may be included.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. The storage device may access the electronic device through an external port.

Further, a separate storage device on a communication network may access a portable electronic device.

As described above, the electronic device, which supports a plurality of networks, selects the serving network in consideration of the channel environment-related index of each network, thereby providing a data service at an optimal data transmission rate in an actual wireless environment.

Meanwhile, although concrete embodiments have been described in the detailed description of the present disclosure, operation sequences of the electronic device may be changed, combined, or re-used and may be variously modified such as omission without departing from the scope of the present disclosure. Therefore, the scope of the present disclosure should not be defined as being limited to the embodiments, but should be defined by the appended claims and equivalents thereof.

The invention claimed is:

1. A method of operating an electronic device, the method comprising:
   identifying a first network and a second network that are accessible;
   transmitting, to a first access point of the first network and a second access point of the second network, channel environment information regarding the electronic device;
   receiving information on a first Modulation and Coding Selection (MCS) level corresponding to the first network, wherein the first MCS level is determined by the first access point in consideration of the channel environment information;
   receiving information on a second MCS level corresponding to the second network, wherein the second MCS level is determined by the second access point in consideration of the channel environment information;
   identifying each data transmission rate of the first network and the second network respectively based at least in part on the first MCS level and the second MCS level;
   selecting a network to be accessed having a higher data transmission rate based on the identified each transmission rate of the first network and the second network; and
   accessing the selected network.

2. The method of claim 1, wherein the selecting the network to be accessed comprises selecting the network among the first network and the second network further based on at least one of a Resource Block (RB), Carrier Aggregation (CA), a band width, and network load.

3. The method of claim 1, further comprising identifying the channel environment information corresponding to each of the first network and the second network by performing a ping test on the first network and the second network.

4. The method of claim 1, wherein the channel environment information includes at least one of a Received Signal Strength Indicator (RSSI), Reference Signal Received Power (RSRP), Reference Signal Received Quality (RSRQ), a signal to noise ratio (Ec/Io), and a Channel Quality Indicator (CQI).

5. The method of claim 1, further comprising:
   accessing the first network;
   while accessing the first network, entering a service area of the second network; and
   in response to identifying the second network that is accessible, selecting the network having a higher data transmission rate among the first network and the second network.

6. The method of claim 5, further comprising:
   while accessing the first network, identifying whether the first MCS level corresponding to the first network is less than a reference MCS level;
   in response to identifying that the first MCS level is greater than or equal to the reference MCS level, maintaining accessing the first network; and
   in response to identifying that the first level is less than the reference MCS level, identifying whether the second network is accessible.

7. The method of claim 1, wherein the selecting the network to be accessed comprises selecting the network to be accessed further based on Channel Quality Indicator (CQI).

8. An electronic device comprising:
   a memory;
   a plurality of communication systems; and
   a processor configured to:
   identify a first network and a second network that are accessible,
   transmit, to a first access point of the first network and a second access point of the second network, channel environment information regarding the electronic device,
   receive information on a first Modulation and Coding Selection (MCS) level corresponding to the first network, wherein the first MCS level is determined by the first access point in consideration of the channel environment information,
   receive information on a second MCS level corresponding to the second network, wherein the second MCS level is determined by the second access point in consideration of the channel environment information,
   identify each data transmission rate of the first network and the second network respectively based at least in part on the first MCS level and the second MCS level,
   select a network to be accessed having a higher data transmission rate based on the identified each data transmission rate of the first network and the second network, and
   access the selected network.

9. The electronic device of claim 8, wherein the processor is configured to select the network among the first network and the second network further based on at least one of a Resource Block (RB), Carrier Aggregation (CA), a band width, and network load.

10. The electronic device of claim 8, wherein the processor is configured to identify the channel environment information corresponding to each of the first network and the second network by performing a ping test on the first network and the second network.

11. The electronic device of claim 8, wherein the channel environment information includes at least one of a Received Signal Strength Indicator (RSSI), Reference Signal Received Power (RSRP), Reference Signal Received Quality (RSRQ), a signal to noise ratio (Ec/Io), and a Channel Quality Indicator (CQI).

12. The electronic device of claim 8, wherein the processor is further configured to:
   access the first network;
   while accessing the first network, enter a service area of the second network; and
   in response to identifying the second network that is accessible, select the network having a higher data transmission rate among the first network and the second network.

13. The electronic device of claim 12, wherein the processor is further configured to:
   while accessing the first network, identify whether the first MCS level corresponding to the first network is less than a reference MCS level;
   in response to identifying that the first MCS level is greater than or equal to the reference MCS level, maintain accessing the first network; and
   in response to identifying that the first level is less than the reference MCS level, identify whether the second network is accessible.

14. The electronic device of claim 8, wherein the processor is configured to select the network to be accessed further based on Channel Quality Indicator (CQI).

15. The electronic device of claim 8, wherein the plurality of communication systems support at least two networks of a Global System for Mobile Communication (GSM) network, an Enhanced Data GSM Environment (EDGE) network, a Code Division Multiple Access (CDMA) network, a Wideband Division Multiple Access (W-CDMA) network, a High Speed Packet Access (HSPA) network, an Evolved HSPA (HSPA+) network, a Long Term Evolution (LTE) network, and a Wireless Local Area Network (WLAN).

16. The electronic device of claim 8, wherein the first MCS level is determined by the first access point in consideration of one or more of a Channel Quality Indicator (CQI), a Signal to Interface and Noise Ratio (SINR), and network load.

* * * * *